United States Patent
Umemoto

Patent Number: 5,862,764
Date of Patent: Jan. 26, 1999

[54] METHOD AND APPARATUS FOR A FLOATING FRAME FIELD HARROW

[76] Inventor: Tosh Umemoto, 5321 S. Campbell Rd., Wapato, Wash. 98951

[21] Appl. No.: 846,147

[22] Filed: Apr. 25, 1997

[51] Int. Cl.$^6$ ..................................................... A01C 23/00
[52] U.S. Cl. ........................... 111/127; 111/924; 172/198; 172/695; 172/772
[58] Field of Search ..................................... 111/127, 118, 111/923, 924, 123, 124, 126; 172/197–200, 228, 189, 695, 772, 765, 23, 4.5, 395, 669

[56] References Cited

U.S. PATENT DOCUMENTS

| | | | |
|---|---|---|---|
| 96,836 | 11/1869 | Preston | 172/198 |
| 649,595 | 5/1900 | Brown | 172/197 |
| 869,065 | 10/1907 | Datson | 172/189 |
| 1,102,671 | 7/1914 | King | 172/684.5 |
| 1,382,977 | 6/1921 | Holmes | 172/493 |
| 1,594,085 | 7/1926 | Wills | 172/684.5 X |
| 1,712,483 | 5/1929 | Sutherland | 172/191 |
| 2,538,705 | 1/1951 | Rada | 172/251 |
| 2,997,115 | 8/1961 | Moser | 172/197 |
| 3,225,835 | 12/1965 | Steinbach | 172/198 |
| 3,991,831 | 11/1976 | Foster | 172/198 |
| 4,361,191 | 11/1982 | Landoll et al. | 172/200 X |
| 4,450,916 | 5/1984 | Francis | 172/197 X |
| 4,582,142 | 4/1986 | Bridge | 172/34 |
| 5,183,119 | 2/1993 | Wattenburg | 171/105 |
| 5,251,704 | 10/1993 | Bourgault | 172/311 |
| 5,259,327 | 11/1993 | Thompson, Jr. et al. | 111/118 |

OTHER PUBLICATIONS

Glencoe soil finisher brochure, pp. 1–6, Dec. 1983.

*Primary Examiner*—Thomas B. Will
*Assistant Examiner*—Victor Batson
*Attorney, Agent, or Firm*—Stratton Ballew PLLC

[57] ABSTRACT

A method and apparatus for a harrow is provided, and more particularly to a harrow implement with a terrain following frame, able to be pulled by a tractor. The improved harrow includes a main frame that supports at least a floating frame on which harrowing blades are attached. The harrow blades follow the contours of a field or bed of soil, resulting in greatly improved tilling when compared to conventional apparatus used for this purpose. The harrow specifically suits the needs of a reduced tillage farming operation. The harrow is wide, yet the floating frames follow irregular surface contours, significantly improving the potential range of topography that can be farmed efficiently. The harrow can include a clod diverter to move or deflect clods to the irrigation furrows, away from the planting rows. It can also be customized in the field to handle the individual field's requirements, including tilling depth and seed row separation distances. The harrow can also incorporate a spray rigging that applies sprays onto the soil as it is tilled.

11 Claims, 4 Drawing Sheets

METHOD AND APPARATUS FOR A FLOATING FRAME FIELD HARROW

TECHNICAL FIELD

The invention relates to a method and apparatus for an improved harrow, and more particularly to a harrow with a terrain following frame, which can be attached to and pulled by a tractor.

BACKGROUND OF THE INVENTION

Agricultural crop production requires a bed of soil prepared for planting. A field's soil bed, in order to be ready for planting, must be configured with alternating planting rows and furrows. A planting row is a mound of soil into which a crop seed or sapling is introduced at a regular interval for maturation and eventual harvesting. The furrows adjacent to each planting row provides a channel through which water can flow. The furrow primarily serves as an irrigation channel to distribute water to the field for use by the crop, however the furrows can also channel water out of the field in the case of rains or flooding. This water drainage is vital to crops that will rot in water saturated soils.

A harrow is an implement that farmers use primarily to breakup and smooth crop growing soils. Farms of all types require implements for harrowing. The task of properly preparing the ground for planting begins with the tilling and leveling of fallow soil. Besides performing this task, the harrow is also used to kill weeds and cover newly sown seeds.

Many farmers add fertilizers, pesticides or herbicides to the soil simultaneously with harrowing. These fertilizers and chemical additives are applied at early crop growth to provide the best possible growth medium for the crop. Tractor pulled harrows and spray rigs, as separate implements, typically provide these soil preparation functions.

Modern tractors can pull increasingly large harrowing implements. This increase in size enables the farmer to enlarge the scale of their farming operations by expanding their ability to economically prepare and maintain crop growing soils. However, other factors reduce the efficiency of the modem farm. The available acreage of arable land is declining world-wide. Conversion of farmland to non-farming uses is a primary reason for this decline, however much of this arable soil, though may be once in prime condition, degrades over the years as farm chemicals, wind erosion, salt formation and nutrient depletion from over-farming, take their respective tolls.

Additionally, the lack of economical, dependable and clean water casts another cloud on the farm operation. Dwindling ground water resources, water allocation rights disputes, and water pollution results in an inability to farm on land that would otherwise be productive but for the lack or uncertainty of water availability from planting through harvest.

Government regulations, in an attempt to correct current problems, often only further hobble the farmer. Land use and growth management laws effectively lock up potential farm lands. Additionally, agricultural pesticides and herbicides are under increasing scrutiny, resulting in frequent bans and restrictions on their application. These limitations result in a steady reduction in the farmer's ability to economically control weeds and pests.

Additionally, the disfavor of farm chemicals by the government and the public has induced a resurgence of interest in organic farming methods. Methods that employ non-chemical means to achieve weed and pest control are urgently needed to makeup for the loss of chemicals once depended upon as mainstays of the modern farm.

When herbicides became readily available in the 1960's, many farmers began to use a "no-till" method for growing crops. In the no-till system, wastes from the preceding crop are left on the field as a covering called mulch. Farmers spray the mulch with a herbicide and apply fertilizer. Rain water washes the chemicals down through the mulch and into the soil. Often, no further soil preparation is necessary and the seed bed is ready for planting.

The no-till method improves on traditional tilling methods in several ways. The mulch helps prevent erosion and keep moisture in the soil. By eliminating plowing and harrowing, the method saves both labor and tractor fuel. However, the no-till method also has certain disadvantages. Some weeds are not killed by herbicides, and so weed control becomes a problem. Seeding can be delayed because the mulch keeps fields cooler and moister than is desirable at the start of the growing season. In addition, the heavy use of herbicides may cause environmental problems. In most locations environmental regulations severely limit the use of herbicides.

Today, many farmers still use the no-till method. As an attempt to reap many of the benefits of the no-till system, while additionally achieving the weed and planting control offered by tilling, farmers are adopting reduced tillage or conservation tillage methods. In these methods, deep plowing is replaced by a less invasive implement, such as a harrow. Plant wastes are also left on the surface as mulch, to help control erosion and hold in moisture.

The pressures of water conservation, farm chemical regulation, erosion control and rising labor costs force more farmers to adopt reduced tillage systems as an ideal balance between the herbicide based no-till system and conventional, tillage intensive farm methods. A harrow implement is therefore needed to specifically suit the needs of a reduced tillage farming operation.

Additionally, certain lands have excellent potential for farming, despite topographical irregularities or a small defect in soil quality that prohibits the economical tilling, planting or, harvesting of a crop. The existence of small knolls and gullies can impede the effective, mechanized tilling of prime soils. Typically, these areas are simply bypassed and as a result, unproductive. Currently, large scale grading with heavy machinery is the only way to prepare for crop production in these irregularly contoured areas. Employing heavy machinery to grade hilly soil is expensive and often results in the exposure of inferior soils, especially where the topsoil is thin. For larger farms a narrow harrow, though able to follow irregular contours, is inefficient. The smaller harrow requires many more passes to cover the same area as a larger, conventionally sized harrow. Therefore, a need exists for a wide harrow with the ability to follow irregular contours. A harrow having such an ability would significantly improve the potential range of topography that could be farmed efficiently.

Clay soils also present problems with their inherent clods and hard soil surfaces. Clays are difficult to breakup and convert into a proper seed bed with conventional fillers and harrows. Currently, some harrow designs offer the ability to modify the harrow to suit a range of soil types or harrowing depths, but these modifications are difficult to make in the field or ineffective due to the design of the harrow. There is a need for a harrow better able to prepare substandard soils and giving the farmer an ability to cultivate a wider range of soil types. A need also exists for an improved harrow with more than one specific operational mode.

Harrows are farm implements that when pulled behind a horse or tractor can rake smooth, till, furrow and apply sprays to a field in preparation for planting. Most modern harrows apply the same principles as their horse drawn predecessors but on a larger scale.

There are three main types of harrows; the disc harrow, the spring-tine harrow, and the spike-tooth harrow. The disc, or disk, harrow includes a set of sharp discs, mounted on a shaft. As the disc harrow is pulled forward, the discs revolve, thereby cutting the soil. If the soil is not hard, a disc harrow can be used as both harrow and plow. Disc harrows are the most successful harrow type and came into wide use when farmers began using tractors instead of draft animals. An inherent problem with disc harrows is that they require more pulling power than do the other types of harrows. Further, disc harrows typically cut more deeply and more thoroughly turn the soil as compared to other harrow types. Deeply turning the soil is not desirable in most situations because it dries out the soil by exposing moist underlying soil. This is a significant problem when water is scarce or irrigation expensive. A harrow is needed, therefore, that dependably tills on the large scale of a modern disc harrow, but without the problem of soil moisture loss.

Soil that has been completely turned over by discing often remains stuck together in large chunks. With rising labor and fuel costs, a farmer cannot afford to make multiple passes over large tracts of farmland to prepare for planting. A harrow is needed that is better suited for shallow and even tilling, and so able to level, weed and prepare soils for planting in a single pass.

The second type of harrow, a spring-tine harrow, consists of a strong framework with steel tines attached to lateral frame members. With their spring action, the tines tear into the soil when the harrow moves. Essentially, the tines on the frame "comb" the soil as the harrow is pulled. The spring-tined harrows are well suited for broken-up and rocky ground, because the tines give when they encounter a rock or hard clod of soil.

A limitation with spring-tined harrows is that they work best on generally flat and well-tilled farmland. Irregular contours result in spotty tillage because tines are unable to penetrate into the lower-lying soils. Adjacent tines riding on higher ground lift the entire harrow and prevent any tines from contacting the lower soils. Even if a contour riding spring-tine harrow was developed, another problem remains that the required spring of the tines prevent them from penetrating and aggressively tilling hardened soil surfaces. Therefore, a harrow is needed that follows ground surface contours while combing the soil and aggressively tilling hardened soil.

The third main type of harrow is a spike-toothed harrow. A spike-toothed harrow uses teeth instead of tines, for a more aggressive "bite" into hardened soils. This invention is an improved variation of a spike-toothed harrow. Historically, spike-toothed harrows have consisted of a steel frame with lateral supports. Steel teeth on the lateral supports functions to "comb" the soil as the harrow is pulled. This harrow also traditionally performed best when employed on well-cleared land, without irregular contours.

Improvements to the spike-tooth harrow have been attempted with limited success. For instance, the U.S. Pat. No. 1,382,977 to Holmes shows a harrow with teeth connected to a hinged frame. The frame's hinges are perpendicular to the direction of travel, giving it some ability to ride surface contours, but not to grade and flatten the irregular terrain. The Holmes harrow has another problem in that the entire frame sinks deeply into softer soils, rendering the harrow very difficult to pull. In harder soils, the Holmes harrow rides upon the surface without tilling or scraping. The Holmes harrow fails to exhibit the flexibility to operate under a variety of soil types and conditions. Additionally, changing the lengths of its harrow teeth is impossible. A harrow is needed which is continuously useful until the emergence of crops. Such a harrow is needed to have the ability to either deeply breakup soils prior to planting and after harvest, or shallowly breakup soils without damaging the delicate shoots of emerging seedlings, as required.

The U.S. Pat. No. 1,712,483 to Sutherland narrowly improves upon the Holmes patent by having the ability to employ shorter teeth for pre-emergence harrowing. The Sutherland harrow, as with the Holmes harrow, fails to force the grading and leveling of the soil while also tracking upon the general contours of the ground surface. Therefore, a need exists for a harrow with improved tracking over uneven surface contours.

Improvements have also been achieved in spring-tined harrows. The U.S. Pat. No. 5,251,704 to Bourgault et al. claims a combination spray rig and harrow, with tractor powered takeoff booms that include harrow frames. The independently suspended harrow frames each support an array of tines. As described in Bourgault et al., the harrow's tine arrays line up across the back of the implement in a single line, each array shown with forty spring action tines, all rigidly mounted in the harrow frame. The individual harrow frames are dragged by the booms, attached by cables and chains. As with prior harrows, the Bourgault et al. harrow also fails to actively grade and smooth irregular contours in the soil. The multiple harrow frames in Bourgault et al. simply ride along contours with the take off booms as backstops. After harrowing, the field has essentially the same irregular contours as before the harrowing. The Bourgault et al. harrow rides the contours without the ability to actively flatten and smooth the soil surface.

Even with its improved abilities, the Bourgault et al. harrow is still essentially a spring-tined harrow. Its tines fail to breakup clods and forcibly bite into hardened surfaces that are especially prevalent in poor and fallow ground. The Bourgault et al. harrow also fails to adequately address the need for a harrow to till up until the emergence of crop seedlings. It has an adjustable tine angle that the operator can make in the field, but this adjustment is arbitrary and depends on tine pressure, soil conditions and tine tension. If the operator fails to accurately gauge any of these factors, or if a surface irregularity is encountered, the emerging shoots will be irreparably damaged. A need therefore exists for a harrow capable of tilling hard packed soils and at variable depths to avoid pre-emergent seedlings.

The Bourgault et al. harrow also fails to provide a mechanism for preparing irrigation furrows and seed rows. Due to the need for seed rows to be free from large rocks and clods of soil, a need exists for a harrow with the ability to form irrigation furrows and clear larger clod and rock from the seed rows. Also, the Bourgault et al. harrow fails to level the ground it passes over and its tines do not till aggressively, especially when encountering clay and hard packed soils. This is a problem shared by all spring tine harrows. Another problem it shares with currently used harrowing implements is its inability to be effectively and easily customized in the field for a wider range of uses. Crops at different stages of growth often neighbor each other. A harrow is needed with the ability to be customized in the field to handle the individual field's requirements, including tilling depth and seed row separation distances.

The Bourgault et al. harrow further includes a farm chemical spray rig. The rig has spray nozzles attached to a leading boom member. However, the leading boom member is positioned just prior to the harrow portion of the implement. The spray from these nozzles contacts the ground before its breakup by the harrow tines. This arrangement is undesirable. Preferably, a soil application must be applied to broken and tilled soil, penetrating below the surface, so that moist soil can be contacted and immediately covered by additional soil. A need exists for a harrow that incorporates a spray rig into a harrow that applies the spray onto the soil as it is tilled, instead of immediately before or after the tilling process.

SUMMARY OF INVENTION

According to the present invention, a method and apparatus for an improved harrow, and more particularly to a harrow implement with a terrain following frame, able to be pulled by a tractor. This harrow implement includes a main frame that supports at least a floating frame on which a configuration of harrowing blades are attached. The configuration allows the harrow blades to contact the ground surface. The harrowing blades follow the contours of a field or bed of soil, resulting in greatly improved tilling when compared to conventional apparatus used for this purpose.

The method of the present invention includes flexibly linking at least a floating frame to main frame, and attaching harrow blades to each of the floating frames for contacting a soil surface. The main frame is then dragged and the floating frames follow the contours of the soil surface, allowing the harrow blades to harrow the bed of soil.

According to one aspect of the invention, the harrow employs a non-chemical means to achieve weed and pest control. This ability of this harrow helps make up for the loss of chemicals once depended upon as mainstays of the modem farm.

According to another aspect of the invention, the harrow specifically suit the needs of a reduced tillage farming operation.

According to another aspect of the invention, the harrow is wide, yet able to follow irregular contours. This ability significantly improves the potential range of topography that can be farmed efficiently.

According to yet another aspect of the invention, the harrow prepares substandard soils for planting, giving the farmer an ability to cultivate a wider range of soil types.

According to still another aspect of the invention, the harrow has more than one operational mode.

According to another aspect of the invention, the harrow dependably tills on the same large scale as a modem disc harrow, but with less potential for soil moisture loss.

According to another aspect of the invention, the harrow can include a clod diverter to move or deflect clods to the irrigation furrows, away from the planting rows.

According to another aspect of the invention, the harrow can be customized in the field to handle the individual field's requirements, including tilling depth and seed row separation distances.

According to another aspect of the invention, the harrow can incorporate a spray rig that applies sprays onto the soil as it is tilled, instead of immediately before or after the tilling process.

The invention will be better understood by reference to the following detailed description taken in conjunction with the accompanying drawings.

DETAILED DESCRIPTION OF SPECIFIC EMBODIMENTS

The invention provides an improved method and apparatus for a field harrow. The field harrow is a harrowing implement that prepares a field for planting. Additionally, the field harrow can be used after planting to maintain the field prior to the emergence of the planted seedlings.

Figure 1:
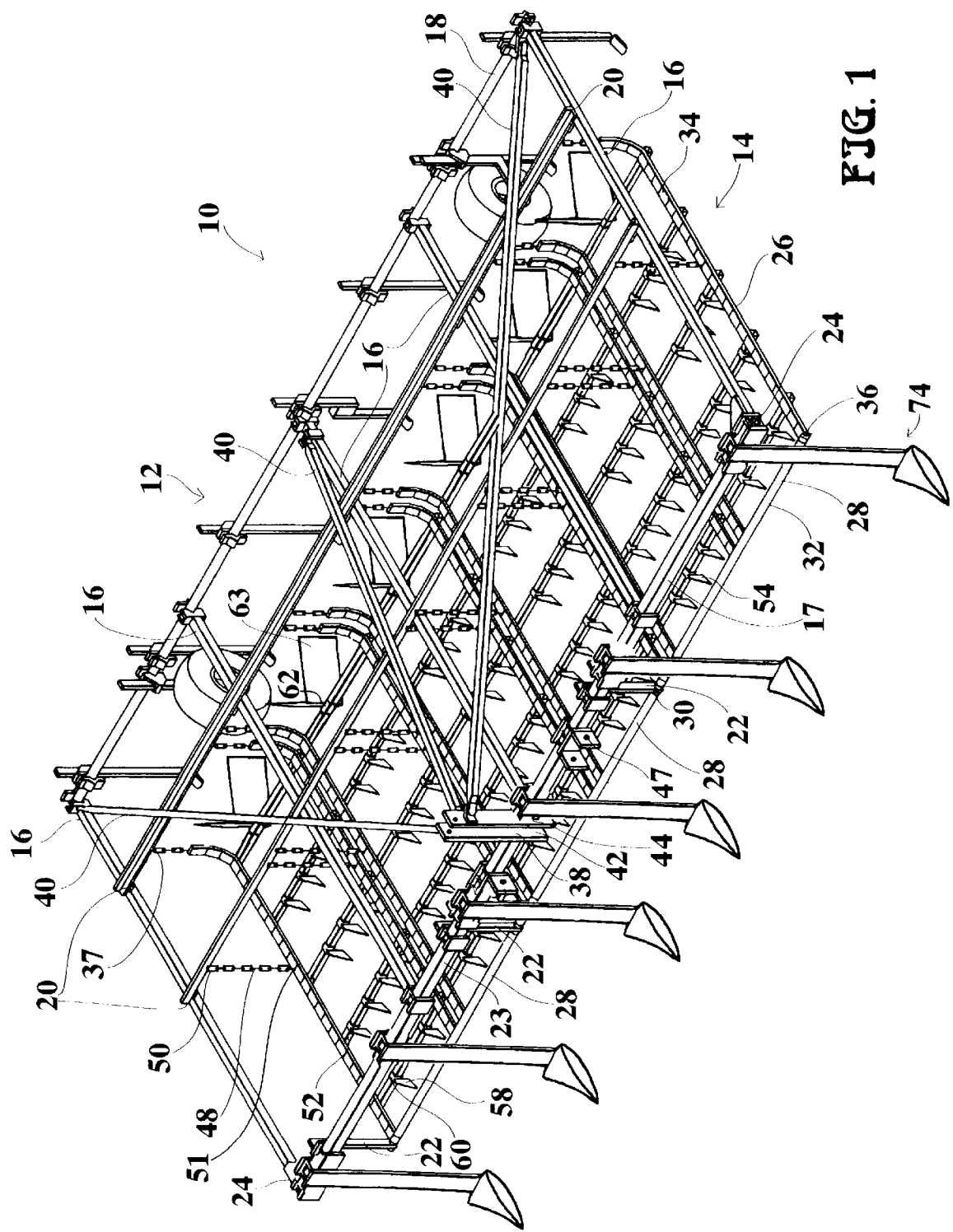
FIG. 1 is a perspective view of an improved field harrow, according to an embodiment of the present invention.

A perspective view of an improved field harrow, according to an embodiment of this invention is shown in FIG. 1. A field harrow 10 includes a main frame 12 and at least a single floating frame 14 that hangs below the main frame. The main frame is preferably constructed from angle, channel and square metal stock, as also shown in FIG. 1. The main frame has at least a single running support 16 connecting a front bar 17 to a back bar 18.

Preferably, the main frame 12 has, as shown in FIG. 1, multiple running supports 16 aligned in parallel, each connecting the front bar 17 to the back bar 18. Also, as shown in FIG. 1, multiple floating frames 14 are preferably employed. The floating frames are arranged in a parallel configuration, all hanging below the main frame.

A plurality of lateral supports 20, as also shown in FIG. 1, preferably cross-connect the running supports 16, forming a grid pattern with the running supports to provide additional structural support for the main frame 12. The main frame 12 also has at least a single lead bar support 22 extending downward from the front 23 of the main frame, preferably attached to the front bar 17. Multiple lead bar supports are preferred, positioned as shown in FIG. 1.

FIG. 1 shows one of the lead bar supports 22 attached to each end 24 of the front bar 17, to allow adequate structural support for each floating frame 14. A lead bar 28 attaches to a base 30 of each lead bar support. Each of the lead bars span the width of one or more floating frames and are located at the leading edge 32 of each floating frame.

Preferably, as shown in FIG. 1, each lead bar 28 spans the width of two neighboring floating frames 14, and is positioned at the leading edge 32 of the floating frames. Also as shown in FIG. 1, each of the lead bar supports 22, extending downward from the front bar 17, is attached at its base 30 to each end of all the lead bars.

Figure 2:
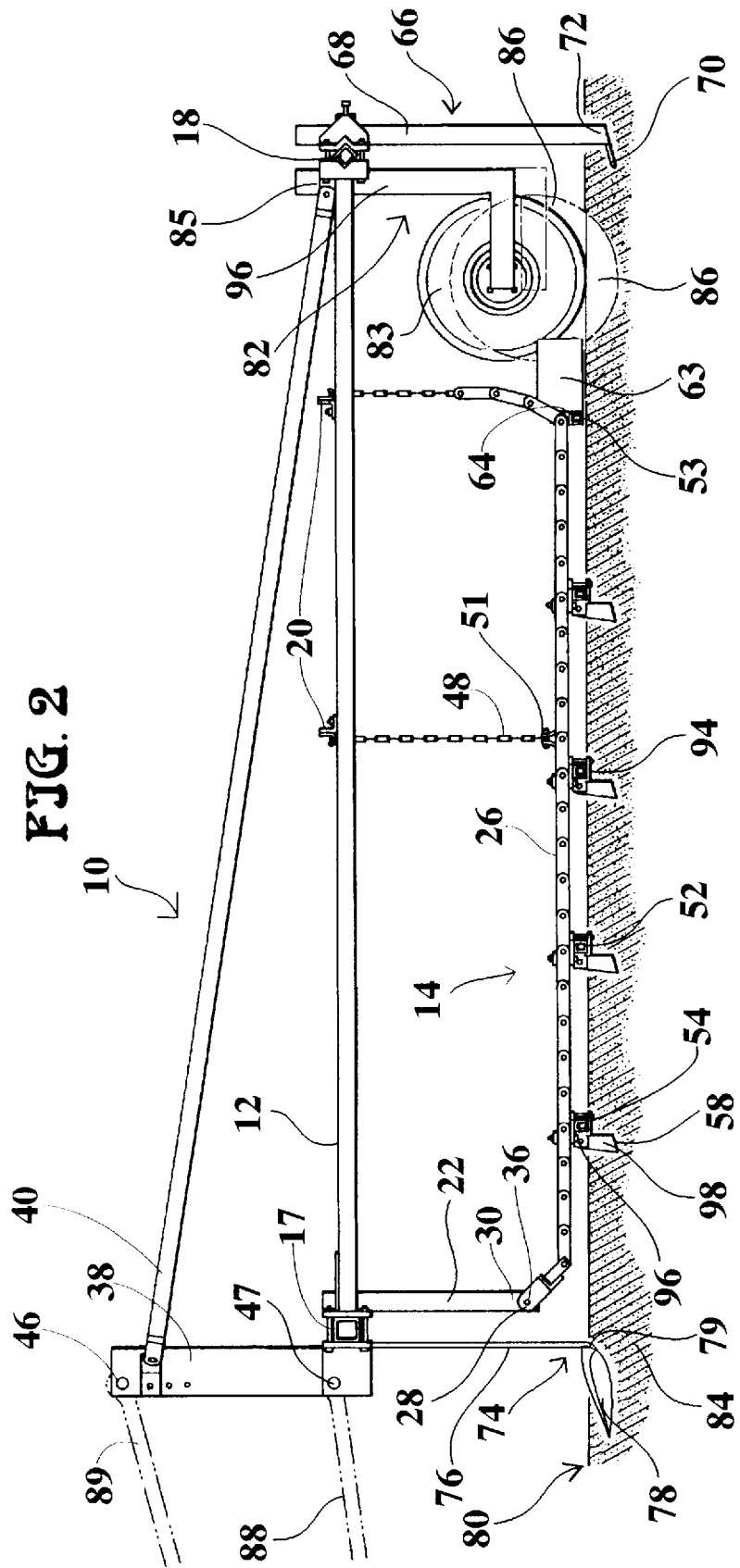
FIG. 2 is an elevation view of an improved field harrow, according to an embodiment of the invention.

Floating frame runners 26 attach to the lead bars 28 by a runner connection 36. The runner connections are preferably hinged to allow the runners to follow the contour of the ground surface 80, as shown in FIG. 2. The floating frame runners can terminate by an attachment (not shown) to the back bar 18 of the main frame 12, but preferably, as shown in FIG. 1, by a main frame attachment 37 to a lateral support 20.

As shown in FIGS. 1 and 2, the main frame 12 has a frame riser 38 that can support a plurality of frame braces 40 and a tractor brace connection 46. Two frame braces are preferred, as shown in FIG. 1. Also preferably, as shown in FIG. 1, a base 42 of the frame riser securely connects to the front bar 17 of the main frame 12 with a welded or bolted frame riser attachment 44. The frame riser preferably extends up to the tractor brace connection 46. Also preferably, a pair of tractor boom connections 47 are welded or bolted to the front bar laterally separated from the frame riser attachment. As shown in FIG. 2, each of the tractor boom connections receives a tractor boom 88 and the tractor brace connection receives a tractor brace 89.

A tractor (not shown), equipped with the tractor brace 89 and the tractor booms 88 can pull the field harrow 10, although any pulling means, such as a draft animal could be employed. This preferred system of braces and booms connecting to the harrow frame for the purpose of pulling the field harrow can be modified to suit a particular pulling means, e.g. mechanical or animal, used to pull the field harrow.

The floating frames 14 are additionally supported by floating frame support chains 48. The plurality of floating frame support chains attach to the plurality of lateral support bars 20 by a top connection 50. The floating frame support chains also attach to the floating frames with bottom connections 51. Regularly spaced blade bars 52 laterally connect across the floating frame runners 34. The last blade bar before the main frame attachment 37 is the trail bar 53. Blade assemblies 54 firmly clasp to the blade bars by an assembly connection 56 that is welded or preferably bolted. The blade assemblies include a blade 58 and a blade bracket 60.

In the preferred embodiment, as shown in FIGS. 1 and 2, clod defecters 63 instead of blade assemblies 54 are mounted the trail bar 53. Each clod deflector includes of a thin but rigid rectangular plate 64 bent to form an approximately 90 degree angle in a "V" shape. A point mount 62 is located on the point of the "V" shaped plate 64 of each clod deflector 63. Each of the point mounts connects each of the clod deflectors to the trail bar of the floating frame 14. The point mount may either be a bolted connection or alternatively a welded connection (not shown). Each of the clod deflectors align to the center of each planting row (not shown).

Furrow blades 66 mount on the back bar 18 of the main frame 12. Each of the furrow blades include a furrow blade riser 68 attached to the back bar and extending downward. A furrow blade foot 70 is preferably welded to the base 72 of the furrow blade riser. Each furrow blade foot is aligned between each of the clod deflectors 63, which is also the center of each furrow (not shown).

Additionally, as shown in FIG. 1, furrow plows 74, mount to the front 24 of the main frame 12. The furrow plows include a plow riser 76 that attach to the front bar 17 and extending downward. A plow body 78 attaches to the base 79 of the plow riser. Each furrow plow body aligns with a corresponding furrow blade foot 70 and likewise to a furrow (not shown).

An embodiment of the field harrow 10 is shown in elevation in FIG. 2. FIG. 2 also shows the harrow in relation to a ground surface 80. The main frame 12 of the field harrow is substantially parallel to the ground surface. Preferably, two adjustable height wheeled supports 82 are employed, each wheeled support having at least a wheel 83. During harrowing, the wheels on the wheeled supports act as stops, to support the back bar 18 of the harrow. The wheels maintaining the back bar at a proper height for harrowing and prevent each harrow blade foot 70 from sinking too low into the soil 84.

The furrow plows 74 penetrate the ground surface 80 and initially form the furrows (not shown) as the plow body 78 carves into the soil 84. The furrow plows also mound the soil 84, including larger clods (not shown) and rocks (not shown), into planting rows (not shown). The lead bar 28 and the blade bars 52 that follow, flatten and widen these mounded planting rows. The blades 58 of the harrow 10 also rake the soil of the mounded planting rows, breaking up the larger clods.

Figure 3:
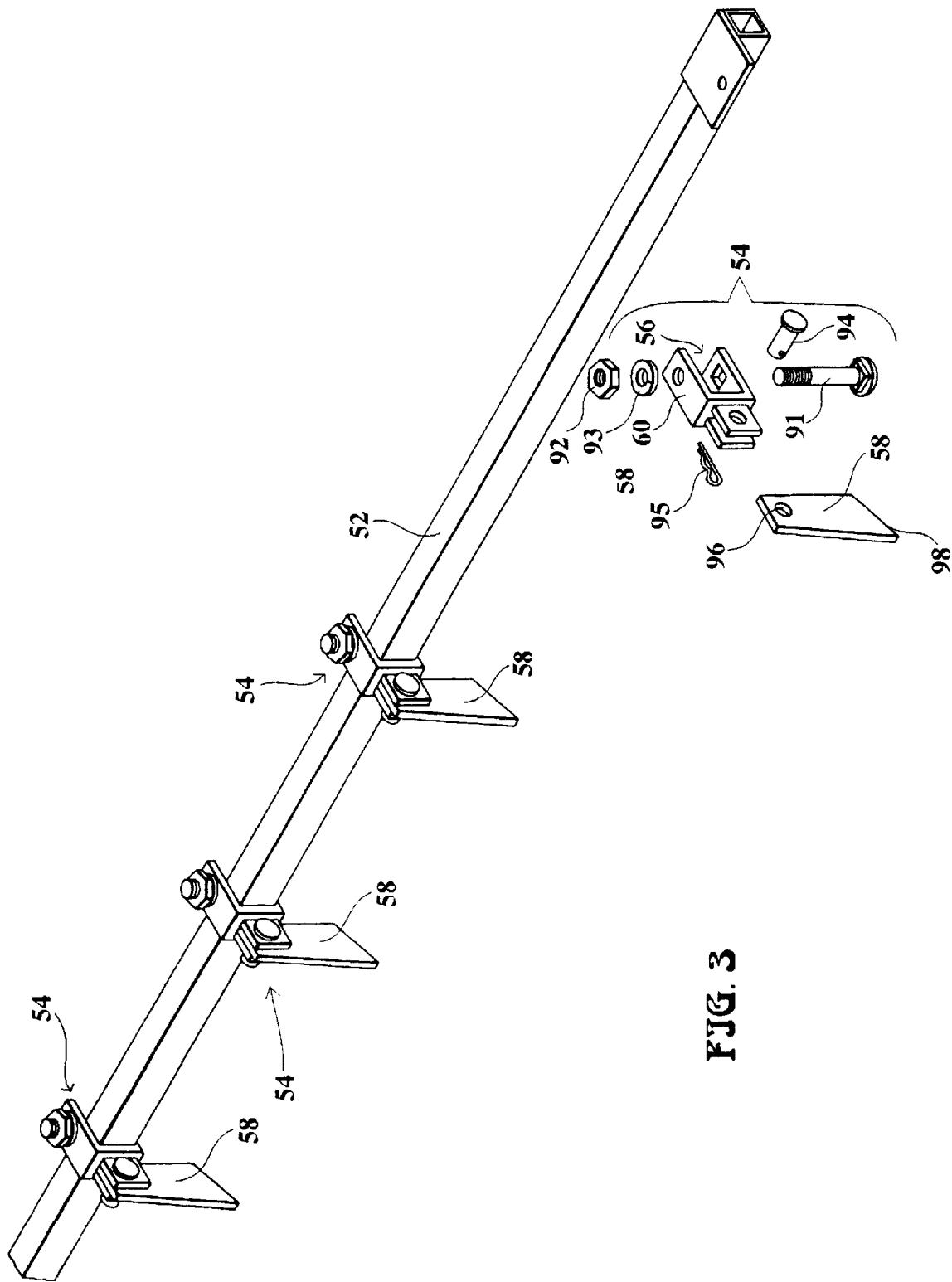
FIG. 3 is a partial perspective view of an improved field harrow's blade assembly, according to an embodiment of the invention.

FIG. 3 details the attachment of the blades 58 of the harrow 10 to the blade bar 52. The blades are each included in a blade assembly 54. Preferably, the blade assembly includes a blade bracket 60 that is attached to the blade bar by the assembly connection 56. The assembly connection preferably comprises a carriage type bolt 91 and a nut 92 on a spring washer 93. The blade is attached to the blade bracket with a clevis type blade holder pin 94 inserted through a top penetration 96 in the blade and a corresponding penetration in the bracket. The blade holder pin preferably receives a coffer pin 95 to prevent the blade holder pin from working its way out of the bracket, and yet provide for the easy removal of the blade from the bracket.

Each of the individual blades assemblies 54 of the harrow 10 are easily removed from or moved on the blade bars 52, by removing the nut 92 and then bolt 91, or loosening the nut as required, and so the blade assemblies are field adjustable. Additionally, in the instance one of the blades 58 breaks or is damaged, an operator can replace or remove a blade simply by pulling out the cotter pin 95, removing the blade holder pin 94 and sliding the blade out of the assembly 54.

Each blade 58 also includes a tip 98. The tip is located opposite the top penetration 96. The length of a blade is measured from the tip of the blade to the blade bar 52. The optimal length of the blade varies with the intended duty of the field harrow 10. A three inch (3") blade is preferable for initial pre-planting harrowing, while 1¼" blades can then be used for pre-emergence harrowing. Pre-emergence is the stage of plant growth prior to emergence of a plant shoot or seedling (not shown) from the soil 84. In pre-emergence harrowing, care must be taken to select a harrow blade with a length that does not reach the depth of an emerging plant shoot (not shown).

Alternatively, a single set of the blades 58 can be utilized for both pre-planting harrowing and pre-emergence harrowing. Each of the blades can include multiple top penetrations 96 to allow the length of the blade to be selectable by the operator of the harrow 10.

The post-seeding use of the harrow 10 benefits the emerging crop by providing the seedlings with an easier path to the surface as compared to hard packed soils. The pre-emergence harrowing also provides an aerated layer of soil, which enables heat and moisture to better transfer from the surface to the germinating seeds. The harrow also removes weeds that compete for the young seedling's water and nutrients. Instead of choking out the seedlings, the weeds convert into a mulch that insulates, retains water and provides protection for the emerging sprouts.

Alternatively, the blades 58 of the harrow 10 can include a negative slope, so that the tip 98 of the blade extends rearward, back beneath the blade bar 52 to which it connects. This configuration allows weeds and trash, often encountered in fallow fields, to fall off the blades rather than gather on the blades, which often requires the removal of the weeds and trash by hand. The blades can be formed with this negative slope or with the slight positive slope as shown in the embodiment of the harrow illustrated in FIG. 2. Most preferably, the blade bracket 60 can receive any of the blades formed with varying slopes as described herein.

The clod deflectors 63 push any large rocks (not shown) and remaining clods (not shown) off the planting rows (not shown), back toward the furrows (not shown), which were formed by the furrow plows 74. The clod deflectors also further flatten and widen the tops of the planting rows. The flat topped configuration of the planting rows offers more latitude in seeding. A seed (not shown), planted at the proper depth at any location below the flattened top, is in an optimal location for growth. In a normally harrowed field (not shown), the seed must be planted at the crest of the planting row or risk a poor planting location. The flat planting row also offers better resistance to wind and water erosion as compared to a crested planting row. Each of the clod deflectors is positioned over a single planting row (not shown) with the point of its "V" 65 pointed toward the front 24 of the field harrow 10.

When harrowing, stop wheels 83 prevent the field harrow from being pulled down into the soil 84. The stop wheels can adjust up to their harrowing position 90, and ride upon the ground surface 80. The stop wheels 83 enable the harrow 10 to travel on ground surfaces that are not to be harrowed, such as paved or gravel roads. An adjustable support mount 85 connects each wheeled support 82 to the back bar 18. The adjustable support mount allows each wheeled support to be lowered to a travel position 86, thereby raising the back bar relative to the ground surface. For travel upon roads, the main frame 12 is also elevated by raising a pair of tractor booms 88, that hingeably connect to the tractor boom connections 47. Raising the pair of tractor booms elevates the leading edge 28 located at the bottom of the lead bar support 22, which clears the floating frame 14 from contact with the ground surface.

Finally, furrow blades 66 mounted on the back bar 18 of the main frame 12 re-establish each irrigation furrow (not shown). This assures that no rocks or large clods of soil 84 block the irrigation furrows, especially after being pushed from the planting rows (not shown) by the clod deflectors 63.

In a preferred method of the present invention, a main frame 12 is removably attached behind a pulling means (not shown) for dragging the main frame. The pulling means can comprise a tractor, a bulldozer, or a draft animal. Self-propelled embodiments are also considered. But preferably however, the pulling means is attached to the tractor via the tractor brace connection 46 and tractor boom connections 47, each connected to the tractor booms 88, as shown in FIGS. 1 and 2.

At least one floating frame is flexibly linked to the main frame. This flexible attachment can comprise a chain link or short links of metal. Harrow blades are attached to each floating frame for contacting a soil surface. The bed of soil is harrowed by dragging the main frame, allowing each floating frame to follow a contour of the soil surface.

Figure 4:
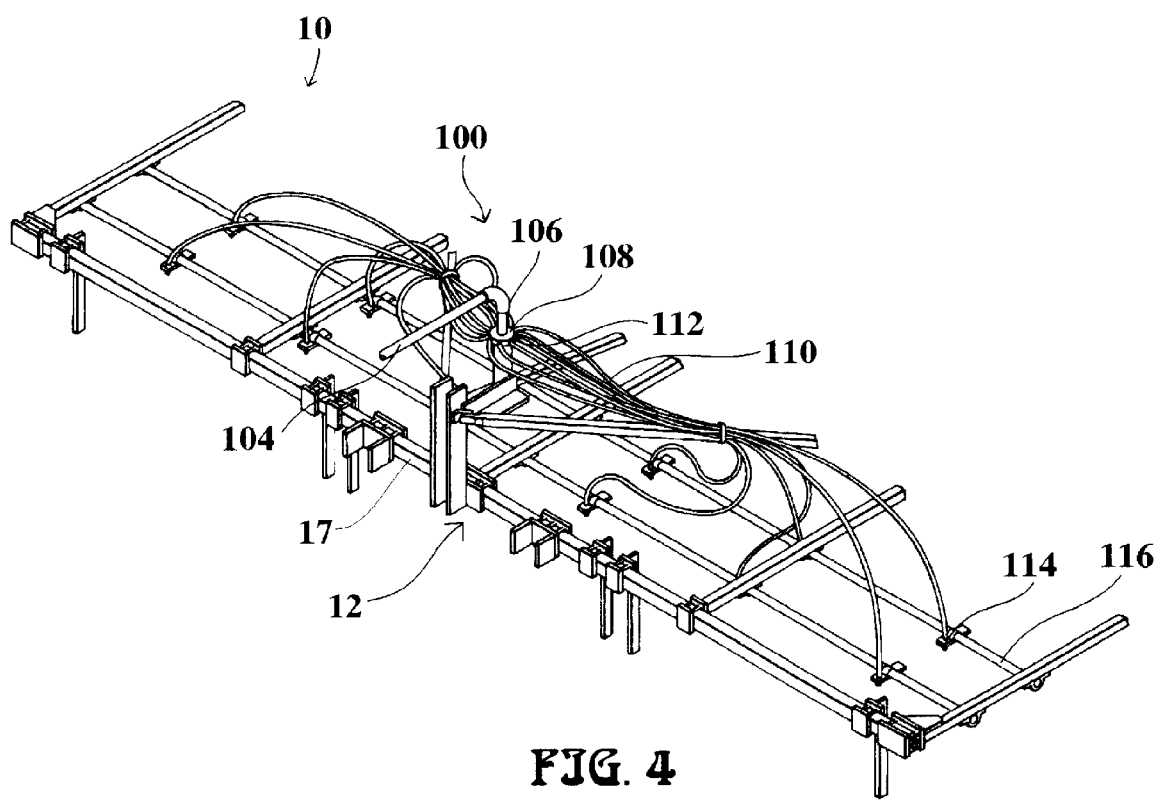
FIG. 4 is a partial perspective view of an improved field harrow, according to another embodiment of the invention.

FIG. 4 shows a partial perspective view of the alternative addition of a sprayer attachment 100 to the field harrow 10. The main frame 12 is modified to include the spray attachment for the application of soil additives such as fertilizers, herbicides or fungicides. A pump (not shown), mounted on the tractor (not shown), delivers the soil additives (not shown) through a supply hose 104 to a spray manifold inlet 106. The spray manifold 108 splits the liquid stream of soil additives delivered from the supply hose, into liquid streams for nozzle hoses 110 connected to the manifold outlets 112. Spray nozzles 114, mounted upon additional lateral main frame members 116, deliver the soil additives directly into the soil 84 as it is tilled by the harrow blades 58.

In practice, the arrangement of plows, blades and deflectors of the present invention significantly enhance the soil's condition, especially in rocky, poorer quality soil, and in fallow fields hampered with weeds or a clay hardened surface. The field harrow 10 provides built-up planting rows with flat tops. The planting rows are also free from rocks and clods, and additionally, deeply tilled and aerated. Most remarkably, the harrow prepares this seed bed of exceptional quality on a single pass.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims that follow.

What is claimed is:

1. A field harrow comprising:

a main frame configured substantially parallel to a ground surface, the main frame having a front bar rigidly connected to a back bar by at least a single running support, the front bar having a lead bar support rigidly attached and substantially perpendicular to the front bar, extending downward, the back bar having a trail bar support attached to the back bar and substantially perpendicular to the back bar, extending downward, the lead bar support connected to a lead bar, the trail bar support connected to a trail bar; and at least a single floating frame, the floating frame including a plurality of floating frame runners, and at least a single harrow blade, each of the floating frame runners having a lead end and a trail end, the floating frame runners having a substantially parallel configuration relative to each other, each of the lead ends hingeably connected to the lead bar and each of the trail ends connected to the trail bar, the trail bar connected to two neighboring floating frame runners, and the harrow blade mounted on the trail bar so as to contact the ground surface.

2. The field harrow of claim 1, further comprising a plurality of wheeled supports attached to the back bar of the main frame.

3. The field harrow of claim 1, further comprising at least a single furrow blade, rigidly attached to the back bar of the main frame, and extending substantially downward vertically.

4. The field harrow of claim 1, further comprising at least a single spray nozzle rigidly attached to the main frame, the spray nozzle having a hose connection, a length of flexible hose having a first end and a second end, the first end connected to the hose connection of the spray nozzle, the second end connected to an outlet of a spray manifold; and a delivery means to deliver a pressurized liquid spray formulation into an inlet of the spray manifold.

5. The field harrow of claim 1, further comprising at least a single clod diverter, the clod diverter having a diverter blade; and the clod diverter rigidly attached to the back bar, and extending downward, substantially vertically.

6. The field harrow of claim 1, wherein the harrow blade is a harrow blade assembly, the harrow blade assembly comprising:

a harrow blade holder rigidly mounted to the trail bar of the floating frame; and a harrow blade replaceably and rigidly mounted to the harrow blade holder.

7. The field harrow of claim 1, wherein the single running support is a plurality of running supports;

at least a lateral support connects at least two neighboring running supports; and a floating frame support chain hingeably interconnects the lateral support to the floating frame runner.

8. The field harrow of claim 1, further comprising at least a blade bar, parallel to the trail blade bar, connecting two neighboring floating frame runners each having at least a single harrow blade.

9. The field harrow of claim 8, wherein the harrow blade assembly includes a harrow blade holder mounted to the blade bar; and a harrow blade rigidly and replaceably mounted to the harrow blade holder.

10. A field harrow comprising:

a main frame configured substantially parallel, relative to a ground surface, the main frame having a front bar connected to a back bar by a plurality of running supports;

at least two neighboring running supports interconnected by a lateral support;

a floating frame support chain hingeably connecting the lateral support to a floating frame runner;

at least a single floating frame, having a plurality of the floating frame runners, each of the floating frame runners connected between a lead bar and a trail bark in a substantially parallel configuration;

the front bar having a lead support bar attached substantially perpendicular to the front bar, extending downward;

said back bar connected to a trail bar support;

said trail bar connected to the trail bar support, said trail bar connecting two neighboring floating frame runners;

at least a single harrow blade able to contact the ground surface, each harrow blade mounted on the trail bar; and a plurality of wheeled supports attached to the back bar.

11. The field harrow of claim 10, wherein the harrow blade is a harrow blade assembly and comprises a harrow blade holder mounted to the trail bar;

a harrow blade mounted to the harrow blade holder; and each harrow blade being replaceable.

* * * * *